(12) United States Patent
Beavers et al.

(10) Patent No.: US 8,903,305 B2
(45) Date of Patent: Dec. 2, 2014

(54) ADAPTIVE CLICKER TECHNIQUE

(75) Inventors: Jay Curtis Beavers, Duvall, WA (US); Juan Dai, Beijing (CN); Ravipal Soin, Kirkland, WA (US); Christopher H. Moffatt, Sammamish, WA (US); Wei Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1011 days.

(21) Appl. No.: 12/479,736

(22) Filed: Jun. 5, 2009

(65) Prior Publication Data

US 2010/0311031 A1 Dec. 9, 2010

(51) Int. Cl.
*H04H 60/21* (2008.01)
*G09B 5/08* (2006.01)

(52) U.S. Cl.
CPC .................................. *G09B 5/08* (2013.01)
USPC ................................ 455/2.01; 705/7.32

(58) Field of Classification Search
USPC .................... 455/2.01, 66.1; 709/204
See application file for complete search history.

(56) References Cited

U.S. PATENT DOCUMENTS

| | | | |
|---|---|---|---|
| 2002/0007303 A1* | 1/2002 | Brookler et al. | 705/10 |
| 2003/0037110 A1* | 2/2003 | Yamamoto | 709/204 |
| 2004/0153504 A1 | 8/2004 | Hutchinson | |
| 2005/0239036 A1 | 10/2005 | McGar | |
| 2006/0156330 A1 | 7/2006 | Chiu | |
| 2008/0087729 A1* | 4/2008 | Yee et al. | 235/386 |
| 2008/0318518 A1* | 12/2008 | Coutinho et al. | 455/3.06 |
| 2009/0187935 A1 | 7/2009 | Pellinat | |
| 2010/0034125 A1* | 2/2010 | Ralston | 370/310 |

OTHER PUBLICATIONS

Geolearning, Geo|Connect: Deliver a compelling class experience over a Web browser, retrieved from http://www.formavision.net/GeoConnect%20Powered%20by%20WebEx%20Data%20Sheet.pdf, printed on Aug. 4, 2009.
Lawn, A., The briefing room: A virtual press conference, Mar. 31, 2009, retrieved from http://blog.svconline.com/briefingroom/2009/03/31/turning-technologies-unveils-responseware%e2%84%a2-web%e2%80%94a-web-based-polling-system/, printed on Aug. 4, 2009.
Poll Everywhere, Live audience polling, retrieved from http://www.polleverywhere.com/, printed on Aug. 4, 2009.
University of Minnesota, Student response systems overview, Nov. 6, 2008, retrieved from http://www.classroom.umn.edu/notes/support_srs.asp, printed on Aug. 4, 2009.

(Continued)

*Primary Examiner* — Tu X Nguyen
(74) *Attorney, Agent, or Firm* — Steve Crocker; Jim Ross; Micky Minhas

(57) ABSTRACT

An adaptive clicker technique is described that provides a standardized polling control and a registration system to support mixed types of clickers and integrate the polling data. One embodiment of the adaptive clicker technique operates as follows. User inputs from more than one type of clicker device (e.g., personal interactive response system device) are received. The inputs from the more than one type of clicker device are formatted with a clicker adapter for each type of clicker to adapt user inputs to a common polling controller. The adapted inputs are then processed with the common polling controller to interface the adapted inputs with a personal response system software application to allow user polling data to be collected and assessed.

20 Claims, 7 Drawing Sheets

(56) References Cited

OTHER PUBLICATIONS

Webex, Deliver a rich, engaging classroom experience over a web browser, retrieved from http://www.webex.com/pdf/TC_datasheet.pdf, printed on Aug. 4, 2009.

Zhang, Y., S. Zhang, S. Vuong, K. Malik, Mobile learning with bluetooth-based E-learning system, Proc. of the 2006 Int'l Conf. on Wireless Communications and Mobile Computing, pp. 951-956, 2006, Vancouver, British Columbia, Canada, ACM.

* cited by examiner

ADAPTIVE CLICKER TECHNIQUE

BACKGROUND

Interaction in the classroom increases attention and enhances learning. Many modern classrooms now employ polling to increase student participation and interest. Polling can also be designed to collect instant feedback from students, so a teacher can adapt the teaching pace.

Most classroom polling systems have students use personal response system "clickers" to respond to poll questions. A personal response system is one which allows instructors to pose questions to students which students can answer by entering a response into their clicker device.

There are many types of clicker devices employed in personal response systems to date. For example, hardware clicker devices exist which typically have a keyboard with or without a Liquid Crystal Display (LCD). These hardware clicker devices also have a receiver which is typically either an infrared (IR) receiver or a radio frequency (RF) receiver. Infrared receivers typically operate via line of sight and have a more limited range than RF receivers. Infrared receivers are not portable, and typically have to be installed in a class room. RF receivers are more popular and can support a larger number of clickers than can an IR receiver.

Besides hardware clicker devices, virtual clicker devices also exist. Virtual clickers are created by installing clicker software on a laptop computer or other computing device which lets the device act as a clicker device. For example, most virtual clickers employ a web-based poll response keypad that is downloadable from a web or other site. Virtual clickers do not need a receiver because typically a web service is used to send a response to a poll question over the Internet. With the revolution of mobile technology and the increasing penetration of laptops and mobile phones among students, it has become popular to use mobile devices as virtual clickers for polling in schools.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In general, the adaptive clicker technique described herein provides a standardized polling control and registration system to support mixed types of clickers and integrate polling data. The adaptive clicker technique employs a polling controller. The polling controller allows multiple different types of clickers to be used by a software polling application without having to write hardware specific software for each type of clicker device. The polling controller also provides program interfaces for applications (e.g., application programming interfaces or APIs) to communicate with each other using polling data and can integrate the polling data with a Learning Management System or Service if so desired.

More specifically, one general embodiment of the adaptive clicker technique operates as follows. User inputs from more than one type of clicker device (e.g., personal interactive response system device) are obtained or received, for example, in response to polling. The inputs from the more than one type of clicker device are formatted with a clicker adapter for each type of clicker device to adapt the user inputs to a common polling controller. The adapted inputs are then processed with the common polling controller to interface the adapted inputs with a personal response system software application to allow user polling data to be collected.

In the following description of embodiments of the disclosure, reference is made to the accompanying drawings which form a part hereof, and in which are shown, by way of illustration, specific embodiments in which the technique may be practiced. It is understood that other embodiments may be utilized and structural changes may be made without departing from the scope of the disclosure.

DESCRIPTION OF THE DRAWINGS

The specific features, aspects, and advantages of the disclosure will become better understood with regard to the following description, appended claims, and accompanying drawings where:

DETAILED DESCRIPTION

Figure 1:
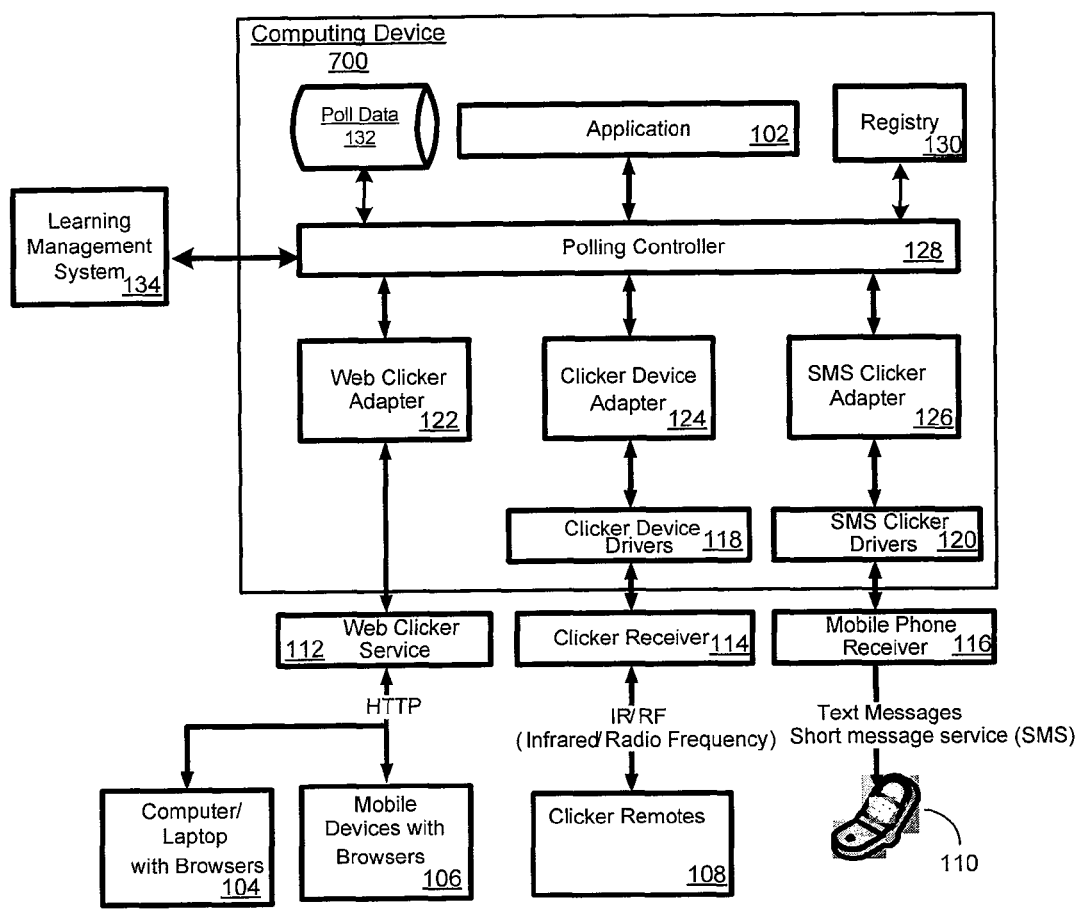
FIG. 1 is an overview of one embodiment of a system for employing an adaptive clicker technique described herein.

In the following description of the adaptive clicker technique, reference is made to the accompanying drawings, which form a part thereof, and which is shown by way of illustration examples by which the adaptive clicker technique may be practiced. It is to be understood that other embodiments may be utilized and structural changes may be made without departing from the scope of the claimed subject matter.

1.0 Adaptive Clicker Technique

Although there are many types of clicker devices used for polling currently there is no standardized polling service which can support disparate types of clickers at the same time. Current polling services currently can support only one type of clicker device.

Additionally, most current polling services and systems require registration for a clicker device to be used with the system. When students are registered with a system, a teacher can assign credit for participation and use the data in other manners. To date, different clickers have totally different registration systems and no systems can support mixed clicker types.

The adaptive clicker technique provides a standardized polling control and registration system to support mixed types of clickers. The adaptive clicker technique employs a polling controller. The polling controller allows multiple different types of clickers to be used by a software application that employs polling without having to write hardware specific software for each type of clicker device. The polling controller also provides program interfaces for applications to communicate with polling data and can integrate the polling data with a Learning Management Service or System (LMS) if so desired. For example, the typical LMS is used for delivering, tracking and managing training. Learning management systems can manage training records and distribute courses over a network, such as, for example, the Internet. The polling controller can also provide program interfaces for managing attendance, class participant and assessment.

Although much of the following description presents the applicability of the adaptive clicker technique with respect to an education system, it should be noted that the technique is not limited to only the educational realm. For example, the technique could equally well be applied to an enterprise space.

The adaptive clicker technique provides a multi-device adapter model for talking to disparate clickers. In one embodiment of the technique, this adapter model 1) gets the readiness of clicker receiver; 2) gets the name of the clicker receiver; 3) gets the properties of the poll data; 4) initiates poll start/end messages and 5) updates poll data.

The adaptive clicker technique also provides easy to use APIs for adding polling to applications. In one embodiment these APIs include 1) set session name; 2) start polling; 3) end polling; 4) get poll data; and 5) set/update poll data.

The adaptive clicker technique also can employ a device registration interface (for example, a user interface with a device registration page) that allows clicker devices to be registered and provides functionality to interface with a Learning Management System if desired. This device registration interface: 1) submits poll data to a LMS; 2) gets class ID; 3) get student name; 4) get device ID and 5) get LMS ID, as well as providing other functionality.

An exemplary schematic of overview of one embodiment of the adaptive clicker technique is shown in FIG. 1. As shown in FIG. 1, one embodiment of the technique employs a personal response system software application 102 that can be used for polling users using clicker devices or clickers, commonly termed personal interactive response devices. The clicker devices are used to respond to poll questions issued by the software application 102. These clickers can come in many types such as virtual clickers on laptop computers 104 or other mobile devices 106. Traditional RF or IR clickers 108 or a cell phone 110 can also be employed as clicker devices. Each of these types of clickers have some type of receiver 114, 116 or service 112 that allows these types of clickers to communicate with a computing device 700 (to be discussed later with respect to FIG. 7) which hosts the software application 102 that issues the polling.

In the one embodiment of the adaptive clicker technique described herein the inputs received from the clicker devices 104, 106, 108, 110, as received from the receivers 114, 116 or service 112 can interface with device drivers 118, 120 that would typically be provided with that type of device to interface the device to a computing device 700. The inputs from the clicker devices, are input into clicker adapters 122, 124, 126, one for each type of clicker device. The clicker device adapters 122, 124, 126 from the clicker input to interface with a common polling controller 128 that controls the polling and formats the received clicker inputs to be compatible with the software application 102. The technique also includes a registry 130 which includes a list of all of the clicker devices registered with the system along with clicker ID and optionally user ID. The poll data is stored in a poll data database 132 and can also be sent to a LMS if so desired.

1.1 Exemplary Adaptive Clicker Architecture

Figure 2:
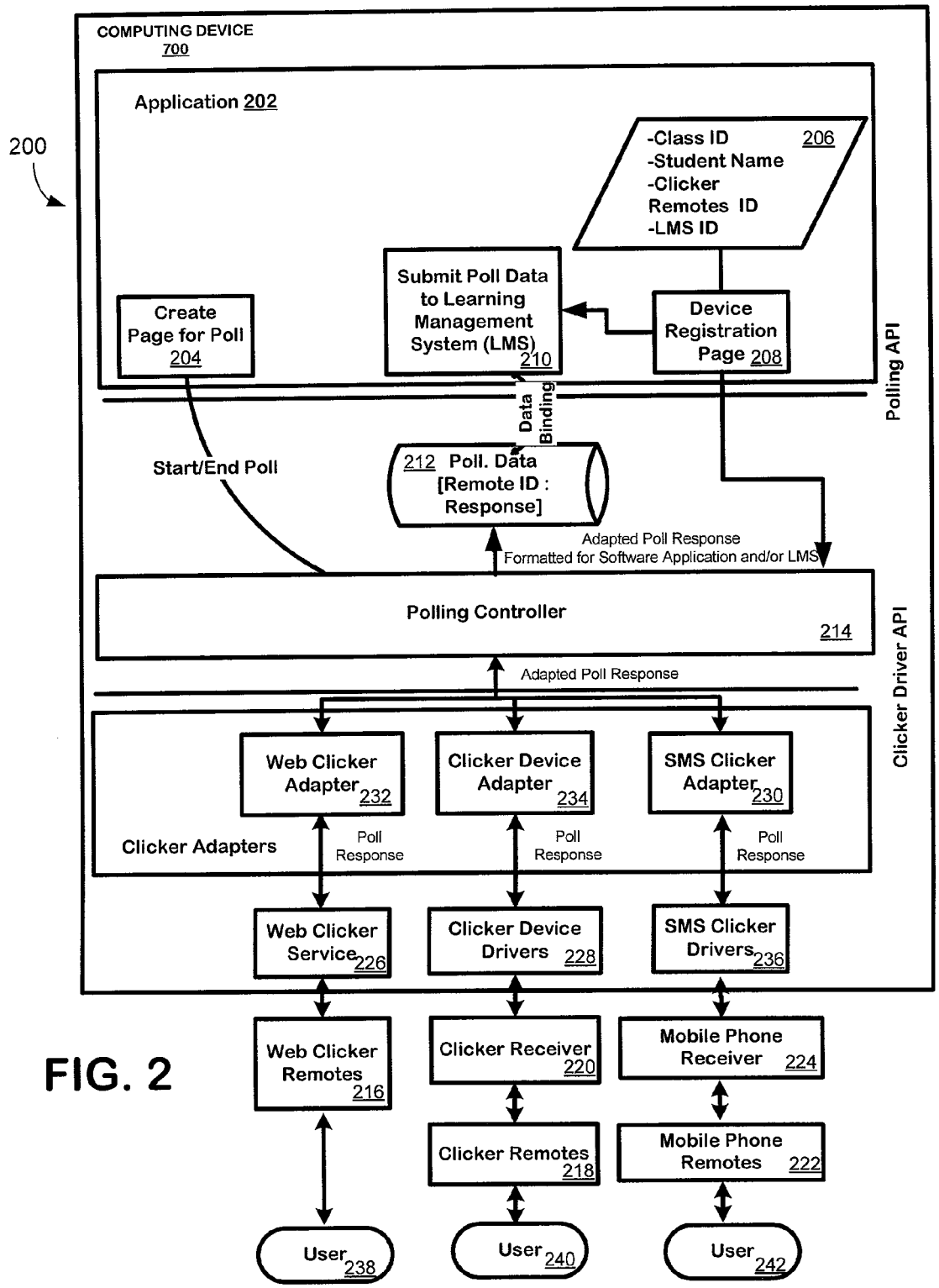
FIG. 2 is an exemplary architecture in which one embodiment of the adaptive clicker technique can be practiced.

The following paragraphs describe an exemplary architecture 200 in which the adaptive clicker technique can be practiced. As shown in FIG. 2, the architecture 200 employs a personal response system software application module 202 that includes a module to create a poll 204 that is used by a teacher or other poll administrator to start and stop a poll which is responded to by users' clicker devices 216, 218, 222. The software application 202 also includes a device registration page 208 where users 238, 240, 242 register their clicker devices. Such registry information 206 can include, for example, a student's class ID, name, clicker remote ID, if the software application interfaces with a greater learning management system, a learning management system ID. Additionally, if the software application 202 interfaces with a learning management system 210, the software application 202 or a polling controller 214 can submit the poll results 212 to the learning management system.

The software application 202 starts and ends a poll by sending start and end poll messages through a polling controller 214 and to the clicker devices 216, 218, 222 via their receivers 220, 224 or web service 226, and applicable device drivers. Users 238, 240, 242 respond to the poll questions via their respective clicker devices 216, 218, 222. The clicker device responses are input into a set of respective clicker adapters, 232, 234, 230 which convert the clicker device inputs 226, 228, 236 from the different types of clickers into a common format compatible with the polling controller 214. It should be noted that there can also be more than one type of clicker device for a given clicker hardware device, such as, for example and IR clicker or RF clicker. The types of clickers would also have their own adapter type. The polling controller 204 reformats the outputs from the adapters 232, 234 and 230 to be in a format usable by the software application 202 and stores the data in the poll result database 212. This poll result data can also be made accessible to the learning management system via interface 210.

1.2 Exemplary Processes for Employing the Adaptive Clicker Technique

Figure 3:
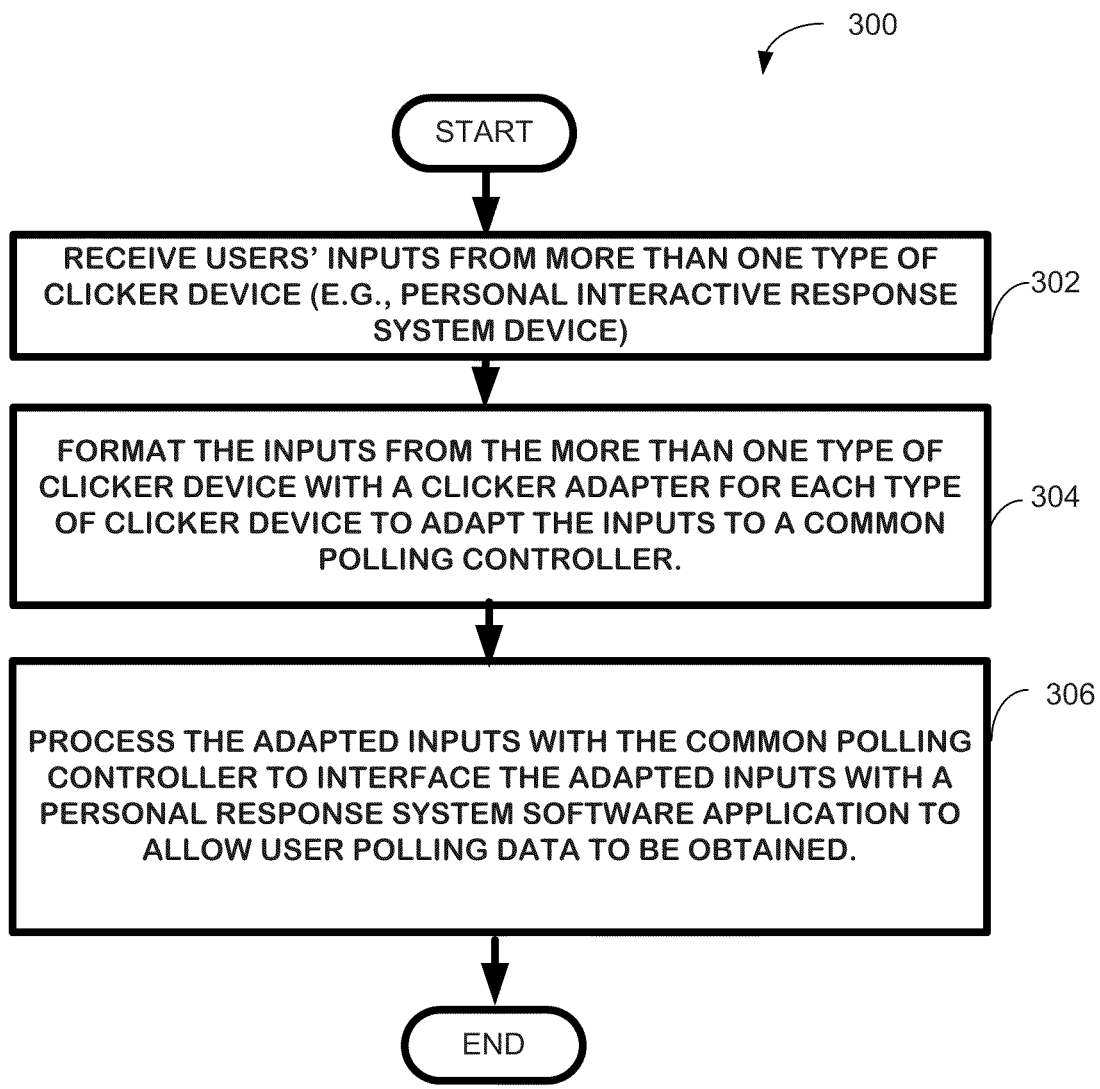
FIG. 3 is a flow diagram depicting a generalized exemplary embodiment of a process employing the adaptive clicker technique.

One general embodiment 300 of a process for employing the adaptive clicker technique is shown in FIG. 3. This embodiment 300 operates as follows. User inputs from more than one type of clicker device (e.g., personal interactive response system device) are obtained, as shown in block 302. The inputs from the more than one type of clicker device are formatted with a clicker adapter for each type of clicker to adapt the user inputs to a common polling controller, as shown in block 304. The adapted inputs are then processed with the common polling controller to interface the adapted inputs with a personal response system software application to allow user polling data to be collected, as shown in block 306.

Figure 4:
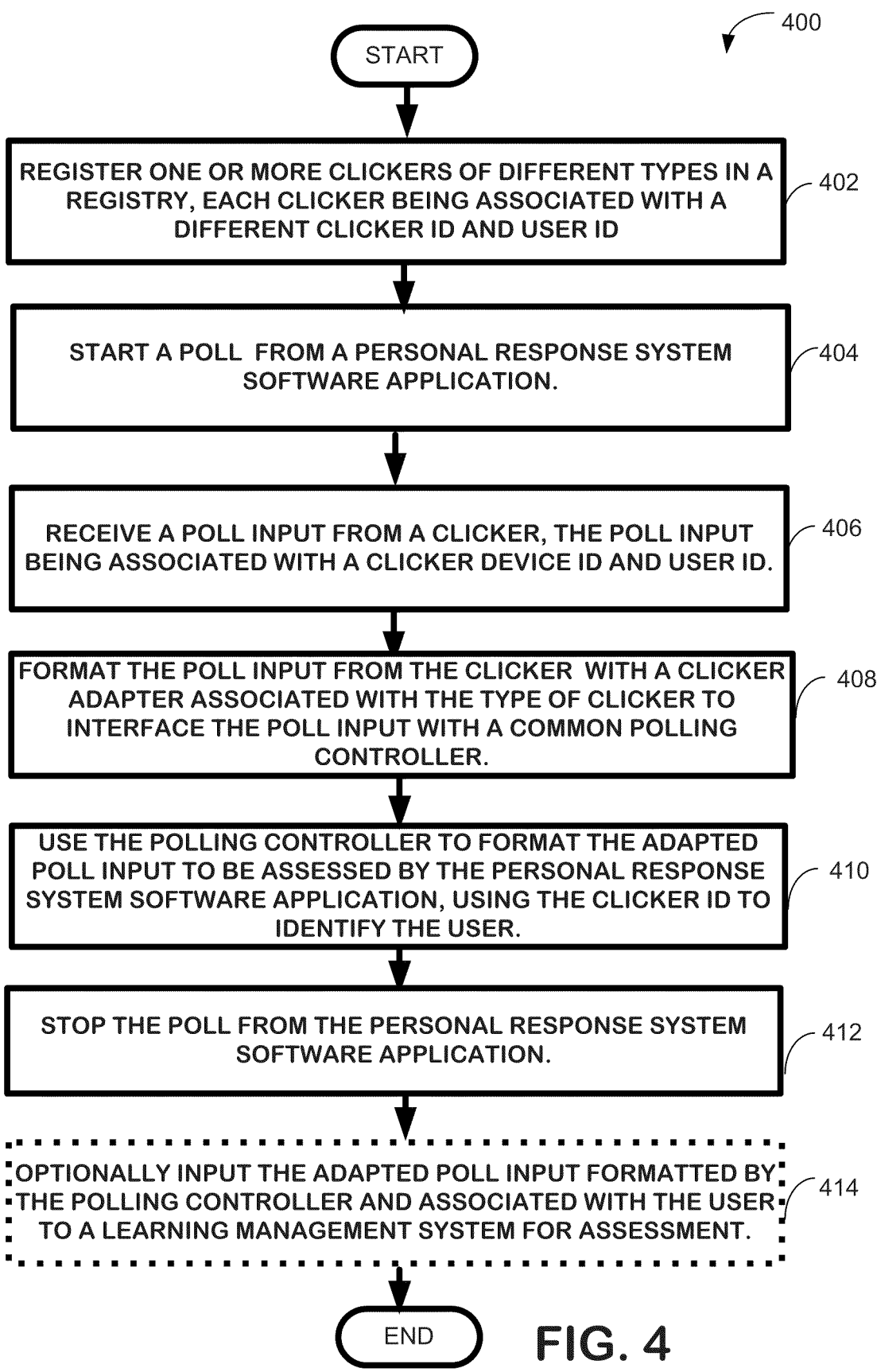
FIG. 4 is another flow diagram depicting another exemplary embodiment of a process employing the adaptive clicker technique.
Figure 5:
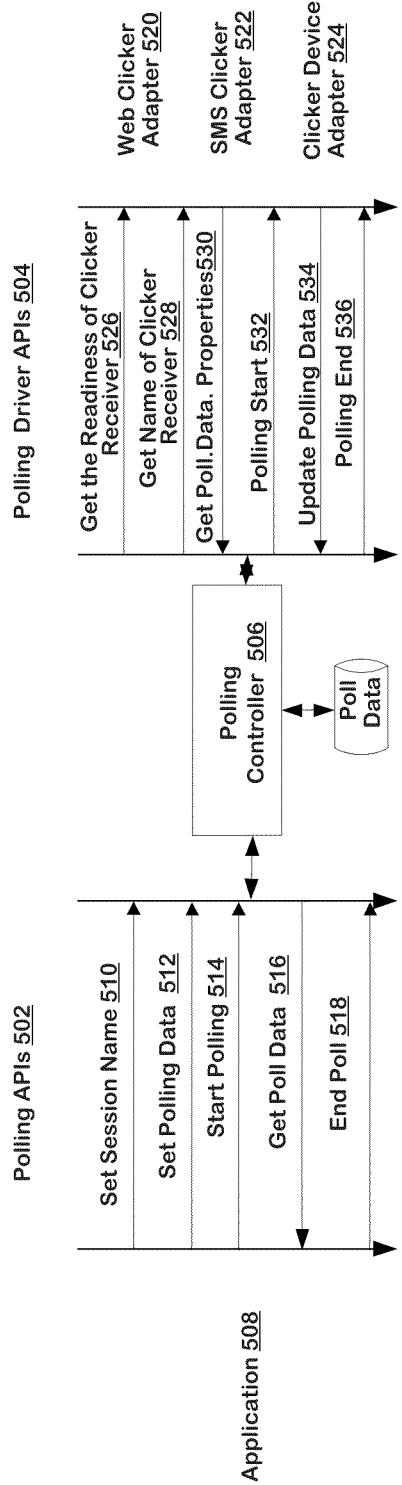
FIG. 5 is a diagram depicting Application Programming Interfaces (APIs) employed in one embodiment that employs an adaptive clicker technique.

Another exemplary embodiment 400 of a process for employing the adaptive clicker technique is shown in FIG. 4. In this embodiment of the technique, one or more clickers of different types are registered in a registry, each clicker being associated with a different clicker ID and user ID, as shown in block 402. A poll is started from a personal response system software application, as shown in block 404. A poll input is received from a clicker device, as shown in block 406. This poll input is associated with a clicker device ID and a user ID. The poll input from the clicker is formatted with a clicker adapter associated with the type of clicker to interface the poll input with a common polling controller, as shown in block 408. The polling controller is used to format the adapted poll input to be assessed by the personal response system software application, as shown in block 410. The clicker ID can be used to identify the clicker user by using the registry. The poll is then stopped by the personal response software application, as shown in block 412. At this point the poll results can be assessed and/or forwarded to a learning management system for assessment, as shown in block 414. For either assessment by the LMS or by the software application, the poll results can be associated by student or user ID. Additionally, the poll data format or one embodiment is also described.

1.4 Details and Alternate Embodiments

An exemplary architecture and exemplary processes of the technique having been described the following paragraphs describe details and various embodiments of the technique. The application programming interfaces (APIs) of one exemplary embodiment of the adaptive clicker technique are described in greater detail, as is the format of the polling data.

1.4.1 Application Programming Interfaces that Interface with the Polling Controller The adaptive clicker technique provides various APIs to support the polling controller and clicker adapters. In one embodiment of the technique the adaptive clicker technique provides both polling APIs 502 and polling driver APIs 504 that interface with the polling controller 506.

The polling APIs 504 that interface between the software application 508 and the polling controller 506 include:
1) Set Session Name: The Set Session Name 510 API sets the session name for the poll in question.
2) Set Polling Data: The Set Polling Data API 512 writes or updates the poll data.
3) Start Polling: The Start Polling API 514 starts the polling. When the polling is started the clicker controller and software application are ready to receive polling inputs.
4) Get Poll Data: The Get Poll Data API 516 retrieves the poll data.
5) End Polling: The End Polling API 518 ends the polling for a given session. When the polling is ended the clicker controller and software application stop receiving polling inputs.

The polling driver APIs 504 that interface between the clicker adapters 520, 522, 524 and the polling controller 506 include:
1) Get the Readiness of Clicker Receiver: The Get the Readiness of Clicker Receiver API 526 gets the readiness of a clicker receiver.
2) Get Name of the Clicker Receiver: The Get Name of the Clicker Receiver API 528 gets the name of the clicker receiver.
3) Get Poll Data Properties: The Get Poll Data Properties API 530 gets the poll data properties of the polling event.
4) Polling Start: The Polling Start API 532 tells the clicker adapters 520, 522 and 524 that polling has started.
5) Update Polling Data: The Update Polling Data API 534 updates poll data, such as, for example, when new poll responses are received or an update to an existing poll response is received.
6) Polling End: The Polling End API 536 ends the polling for a given session. When the polling is ended the clicker controller and software application stop accepting polling inputs.

1.4.2 Poll Data Format

Figure 6:
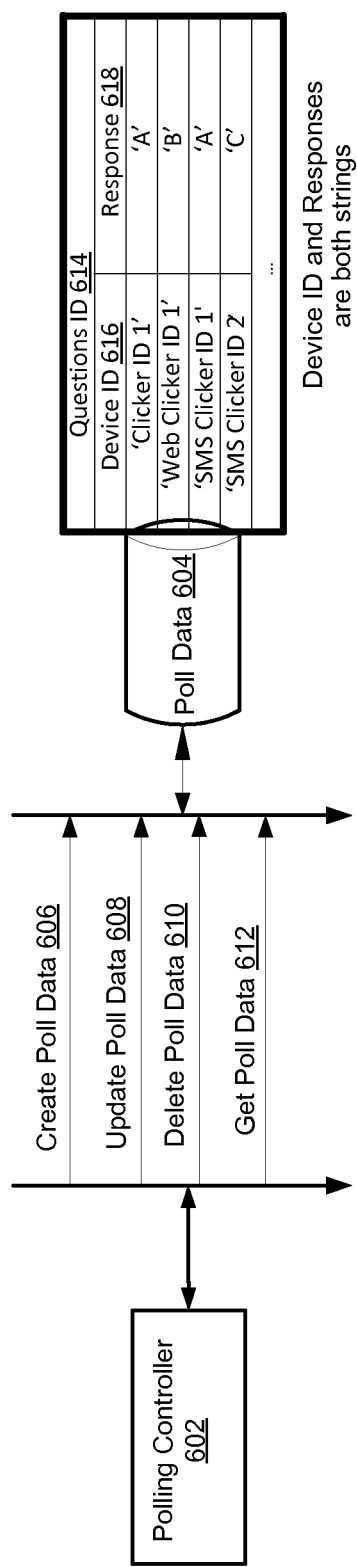
FIG. 6 is a diagram depicting an interface between a polling controller and a poll data database employed in one embodiment that employs an adaptive clicker technique.

The adaptive clicker technique provides the poll data in a standard format via the polling controller. This format for one embodiment of the adaptive clicker technique is shown in FIG. 6. The polling controller 602 provides various APIs to the poll data database. These can include, for example, the "create poll data" 606, "update poll data" 608, "delete poll data" 610 and "get poll data" 612 APIs. An exemplary table of poll data stored in the poll data database 614 is also shown in FIG. 6. The table includes the question ID 614, and device ID 616 and an associated response 618. Optionally a student ID could be added to this table or the student ID could be obtained from the registry by cross-correlating the student ID with the clicker ID.

1.4.3 Device Registration Page

In one embodiment the adaptive clicker technique provides a clicker device registration page. For example, in one embodiment, the device registration page is used to collect and act on information related to a LMS. Such information could include, for example, means to 1) submit poll data to LMS; 2) get class ID; 3) get student ID; 4) get student name; 5) get device ID; and 6) get LMS ID.

2.0 The Computing Environment

The adaptive clicker technique is designed to operate in a computing environment. The following description is intended to provide a brief, general description of a suitable computing environment in which the adaptive clicker technique can be implemented. The technique is operational with numerous general purpose or special purpose computing system environments or configurations. Examples of well known computing systems, environments, and/or configurations that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, programmable consumer electronics, network PCs, minicomputers, mainframe computers, distributed computing environments that include any of the above systems or devices, and the like.

Figure 7:
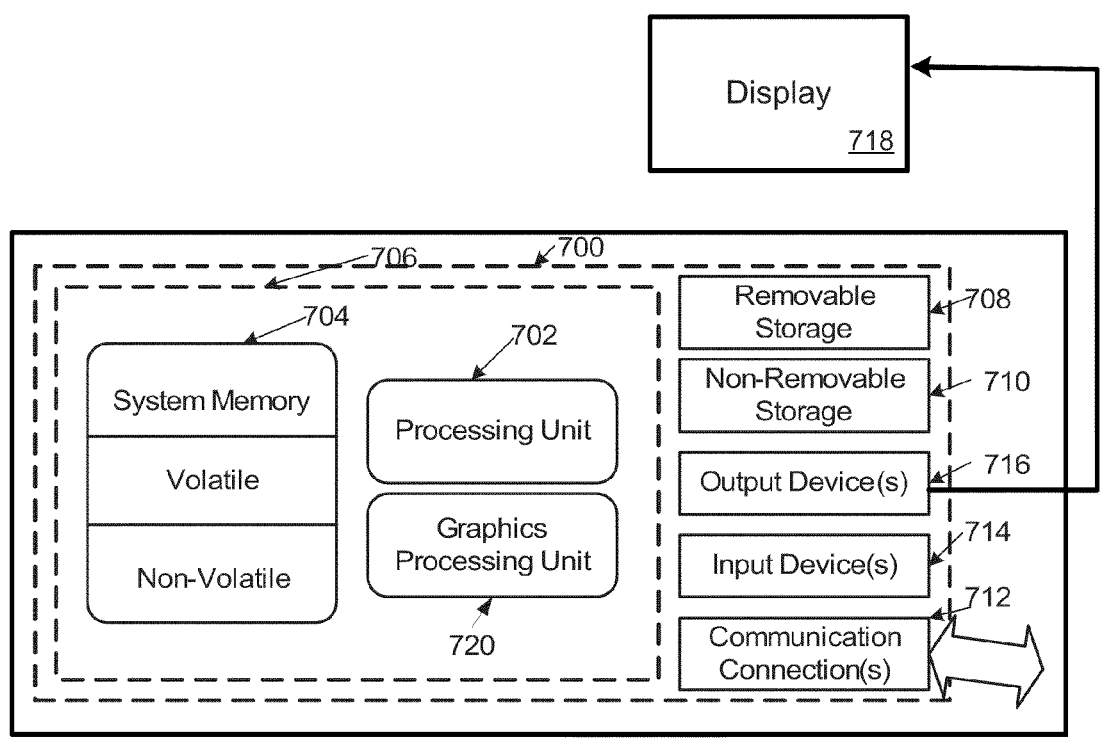
FIG. 7 is a schematic of an exemplary computing device which can be used to practice the adaptive clicker technique.

FIG. 7 illustrates an example of a suitable computing system environment. The computing system environment is only one example of a suitable computing environment and is not intended to suggest any limitation as to the scope of use or functionality of the present technique. Neither should the computing environment be interpreted as having any dependency or requirement relating to any one or combination of components illustrated in the exemplary operating environment. With reference to FIG. 7, an exemplary system for implementing the adaptive clicker technique includes a computing device, such as computing device 700. In its most basic configuration, computing device 700 typically includes at least one processing unit 702 and memory 704. The computing device 700 also has a graphics processing unit 720 to aid in accelerating graphics rendering, among other functions. Depending on the exact configuration and type of computing device, memory 704 may be volatile (such as RAM), non-volatile (such as ROM, flash memory, etc.) or some combination of the two. This most basic configuration is illustrated in FIG. 7 by dashed line 706. Additionally, device 700 may also have additional features/functionality. For example, device 700 may also include additional storage (removable and/or non-removable) including, but not limited to, magnetic or optical disks or tape. Such additional storage is illustrated in FIG. 7 by removable storage 708 and non-removable storage 710. Computer storage media includes volatile and nonvolatile, removable and non-removable media implemented in any method or technology for storage of information such as computer readable instructions, data structures, program modules or other data. Memory 704, removable storage 708 and non-removable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 700. Any such computer storage media may be part of device 700.

Device 700 has a display 718, and may also contain communications connection(s) 712 that allow the device to communicate with other devices. Communications connection(s) 712 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media. The term computer readable media as used herein includes both storage media and communication media.

Device 700 may have various input device(s) 714 such as a keyboard, mouse, pen, camera, touch input device, and so on. Output device(s) 716 such as speakers, a printer, and so on may also be included. All of these devices are well known in the art and need not be discussed at length here.

The adaptive clicker technique may be described in the general context of computer-executable instructions, such as program modules, being executed by a computing device. Generally, program modules include routines, programs, objects, components, data structures, and so on, that perform particular tasks or implement particular abstract data types. The adaptive clicker technique may be practiced in distributed computing environments where tasks are performed by remote processing devices that are linked through a communications network. In a distributed computing environment, program modules may be located in both local and remote computer storage media including memory storage devices.

3.0 Other Embodiments

It should also be noted that any or all of the aforementioned alternate embodiments described herein may be used in any combination desired to form additional hybrid embodiments. Although the subject matter has been described in language specific to structural features and/or methodological acts, it is to be understood that the subject matter defined in the appended claims is not necessarily limited to the specific features or acts described above. The specific features and acts described above are disclosed as example forms of implementing the claims.

What is claimed is:
1. A computer-implemented process for allowing different types of clicker devices to be used in a personal response system, comprising:
   receiving simultaneous inputs from mixed types of personal response system clicker devices in response to a poll conducted by a personal response system software application, each clicker device type having its own type of device driver or service;
   simultaneously formatting the inputs from each device driver or service from the mixed types of clicker devices with a clicker adapter for the type of clicker device to adapt the simultaneously received inputs from the clicker devices into a common format compatible with a common single polling controller;
   formatting the adapted received inputs from each of the clicker adapters into a format that is compatible with the personal response system software application using a polling controller, the polling controller having program interfaces for applications to communicate with each other using the simultaneous inputs from the mixed types of clicker devices;
   simultaneously processing the formatted adapted inputs with the personal response system software application to allow user polling data to be obtained in response to the poll conducted by the personal response data system,
   wherein the receiving, formatting and processing are performed by at least one processor.

2. The computer-implemented process of claim 1 wherein one type of clicker device is a virtual clicker device comprising a computing device and a software application that lets the computing device act as a clicker device.

3. The computer-implemented process of claim 1, wherein one type of clicker device is a radio frequency clicker device.

4. The computer-implemented process of claim 1, wherein one type of clicker device is an infrared clicker device.

5. The computer-implemented process of claim 1, wherein one type of clicker device is implemented on a mobile device.

6. A computer-implemented process for allowing disparate types of clicker devices to be used in a personal response system software application, comprising:
   registering personal response system clicker devices of different types in a clicker device registry using a single registration system, each clicker device being associated with a different clicker ID, user ID and a clicker device driver;
   starting a poll from a personal response system software application;
   simultaneously receiving poll inputs from device drivers of clicker devices of different types, each poll input being associated with a clicker device ID, user ID and a clicker device driver;
   simultaneously adapting each poll input from each clicker device with a clicker adapter associated with the type of clicker device to adapt each poll input to be simultaneously compatible with a common polling controller;
   using the common polling controller to format the adapted poll inputs into a format compatible with the personal response system software application;
   processing each adapted formatted poll input by the personal response system software application to allow user poll data to be simultaneously obtained from the clicker devices of different types.

7. The computer-implemented process of claim 6, further comprising:
   assessing the adapted poll input formatted by the polling controller by the personal response system software application; and
   associating the assessed poll input with the user ID.

8. The computer-implemented process of claim 6, further comprising:

inputting the adapted poll input formatted by the polling controller to a learning management system for assessment, class participation or attendance; and associating the adapted poll input to the learning management system with the user ID.

9. A personal response system, comprising:

a computing device including a memory that has a personal response system software application configured to send data to, and receive inputs from, clicker devices of a personal response system;

more than one clicker adapter, wherein each clicker adapter simultaneously interfaces with a polling controller and the device driver of a clicker of a given type and formats the data for compatibility between the polling controller and the clicker of a given type; and a polling controller that formats the adapted data received from more than one type of clicker adapter to be compatible with the personal response system software application so that the personal response system software application can determine the results of a poll conducted using the formatted adapted received data.

10. The system of claim 9, has program interfaces for other software applications to communicate with each other using poll data and wherein the polling controller further comprises an interface configured to submit poll data to a learning management system.

11. The system of claim 9, further comprising a clicker device registry for registering each clicker device.

12. The system of claim 11, wherein the data entered into the clicker device registry further comprises:

class ID;
student name;
clicker ID;
learning management system ID.

13. The system of claim 9 wherein one type of clicker device comprises:

a web-based clicker that interfaces with a web clicker service that interfaces with a web clicker adapter.

14. The system of claim 8 wherein one type of clicker device comprises a clicker device that is hosted on a mobile phone.

15. The system of claim 9 further comprising Application Programming Interfaces (APIs) between the polling controller and each clicker adapter, the APIs comprising:

an API to get readiness of a clicker receiver:
an API to get a name of a clicker receiver;
an API to get poll data properties of a polling event;
an API to get a polling start;
an API to update polling data; and
an API to signal polling end.

16. The system of claim 9, further comprising Application Programming Interfaces (APIs) between the software application and the polling controller, the APIs comprising:

an API to set polling session name;
an API to set polling data;
an API to start polling;
an API to get poll data; and
an API to end polling.

17. The system of claim 9, further comprising an API between the polling controller and a poll data database, the API comprising:

an API to create poll data;
an API to update poll data;
an API to delete poll data; and
an API to get poll data.

18. The system of claim 9, wherein the poll database further comprises:

a field for a poll question; and
for each clicker,
    a device ID, and
    a response ID.

19. The system of claim 9, wherein the different types of clickers are simultaneously used and further comprise:

more than one type of virtual clicker;
more than one type of RF clicker;
more than one web-based clicker; and
more than one type of IR clicker.

20. The system of claim 9, wherein both the software application and a learning management system can access poll data.

* * * * *